(12) United States Patent
Weber et al.

(10) Patent No.: US 11,052,809 B2
(45) Date of Patent: Jul. 6, 2021

(54) CABLE REEL TRAILER

(71) Applicants: Dennis Weber, Gladstone, MO (US); Samuel M Leonardi, Gladstone, MO (US)

(72) Inventors: Dennis Weber, Gladstone, MO (US); Samuel M Leonardi, Gladstone, MO (US)

( * ) Notice: Subject to any disclaimer, the term of this patent is extended or adjusted under 35 U.S.C. 154(b) by 153 days.

(21) Appl. No.: 15/655,643

(22) Filed: Jul. 20, 2017

(65) Prior Publication Data

US 2018/0022261 A1    Jan. 25, 2018

Related U.S. Application Data

(60) Provisional application No. 62/364,430, filed on Jul. 20, 2016.

(51) Int. Cl.
*B60P 3/035*   (2006.01)
*B65H 49/38*   (2006.01)
*B65H 49/32*   (2006.01)
*B65H 75/42*   (2006.01)

(52) U.S. Cl.
CPC ............ *B60P 3/035* (2013.01); *B65H 49/325* (2013.01); *B65H 49/38* (2013.01); *B65H 75/425* (2013.01); *B65H 2701/34* (2013.01)

(58) Field of Classification Search
CPC .... B60P 3/035; B60P 1/04; B60P 1/24; B60P 1/28; B60P 1/4407; B62D 63/062; B62D 53/062
See application file for complete search history.

(56) References Cited

U.S. PATENT DOCUMENTS

| 121,820 | A | * | 12/1871 | Sprinkel | ............... | B60P 3/41 414/435 |
| 136,941 | A | * | 3/1873 | Sprinkel | ............... | B66C 19/02 414/435 |
| 1,549,471 | A | * | 8/1925 | Engler | ............... | B60P 1/12 298/20 R |
| 1,678,395 | A | * | 7/1928 | Kellems | ............... | B60P 3/035 414/436 |
| 1,861,556 | A | * | 6/1932 | Smith | ............... | B60P 3/035 414/436 |

(Continued)

*Primary Examiner* — Gregory W Adams
(74) *Attorney, Agent, or Firm* — Cargill & Associates, PLLC; Lynn E. Cargill (57) ABSTRACT

The present invention discloses various aspects of a cable reel trailer that uses the automotive force of a tractor or truck used to transport the trailer, a method of making same, and a method of using. The inclusion of a pivotally connected tongue that is pivotally connected to the main frame of the trailer overcomes many of the aforementioned problems with the prior art because there is no motor or hydraulic system necessary for lifting the cable reel securely on to the trailer. In accordance with the present invention, the towing automotive force, such as a truck, tractor or any other hauling vehicle, provides all the power for lifting the cable reel, rather than requiring a separate power source on the trailer for doing the heavy lifting. By locking up the wheel on the trailer with a wheel stop, the forward movement provided by a towing truck can concentrate on lifting the cable reel instead of moving the trailer forward. This means that no separate on-board power is needed for lifting the cable reel.

4 Claims, 8 Drawing Sheets

(56) References Cited

U.S. PATENT DOCUMENTS

| | | | | |
|---|---|---|---|---|
| 1,894,320 A * | 1/1933 | Muchenberger-Wittlin | | B62D 53/062 |
| | | | | 298/5 |
| 2,131,326 A * | 9/1938 | Kaster | | B62D 63/062 |
| | | | | 298/5 |
| 2,507,033 A * | 5/1950 | Marquis | | B60P 1/06 |
| | | | | 298/20 R |
| 2,823,817 A * | 2/1958 | Holsclaw | | B60P 3/1033 |
| | | | | 414/483 |
| 3,690,490 A * | 9/1972 | Hall | | B60P 1/04 |
| | | | | 414/477 |
| 3,690,491 A * | 9/1972 | Butler, Jr. | | B60P 1/28 |
| | | | | 414/483 |
| 3,937,413 A * | 2/1976 | Devine | | B65H 49/38 |
| | | | | 242/557 |
| 3,977,726 A * | 8/1976 | Prestayko | | B60P 1/04 |
| | | | | 298/5 |
| 4,054,218 A * | 10/1977 | Mackey | | B60P 3/04 |
| | | | | 414/572 |
| 4,089,425 A * | 5/1978 | Baltz | | B62D 63/062 |
| | | | | 414/24.5 |
| 4,872,728 A * | 10/1989 | Adams | | B60P 1/24 |
| | | | | 298/5 |
| 5,013,202 A * | 5/1991 | Love | | A01D 87/127 |
| | | | | 414/24.5 |
| 5,411,284 A * | 5/1995 | Harbin | | B60P 1/04 |
| | | | | 280/656 |
| 5,496,144 A * | 3/1996 | Wetz | | A01D 87/127 |
| | | | | 414/24.5 |
| 6,238,166 B1 * | 5/2001 | Collier | | B60P 1/08 |
| | | | | 298/17 R |
| 6,527,494 B2 * | 3/2003 | Hurlburt | | B62D 63/061 |
| | | | | 298/17.5 |
| 6,589,005 B1 * | 7/2003 | Hull | | B60P 3/07 |
| | | | | 280/456.1 |
| 7,556,466 B2 * | 7/2009 | Dufty | | B62D 63/061 |
| | | | | 414/483 |

* cited by examiner

CABLE REEL TRAILER

REFERENCE TO RELATED APPLICATIONS

This application claims the benefit under 35 U.S.C. 119(e) of U.S. Provisional Application 62/364,430 filed on Jul. 20, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to cable reel trailers, methods of manufacturing same, and methods of using same. More particularly, the invention relates to a cable reel trailer that uses an automotive force from a vehicle, whether it be a tractor, a truck or any other type of transport vehicle as the power source to lift the cable reel onto the cable reel trailer.

2. Description of the Prior Art

Conventional cable reel trailers are well known in the art, including one of the most common types of hydraulic lifting trailers. that includes a hydraulic motor. This requires a considerable amount of machinery and battery power, which is undesirable to the industry. It would be desirable to provide a vehicle for transporting heavy cable reel loads over roads to transport a cable reel to the construction site, especially a new type of trailer that does not require its own power supply.

In that regard, the present invention provides a new and improved cable reel trailer for transporting cable reels without needing any additional equipment to raise and lower the cable reel during loading and unloading in a very efficient manner. Furthermore, the present invention is very simple and economical while distributing the weight safely over the axle of the trailer. The load is secured easily and inexpensively, with total safety in mind.

U.S. Pat. No. 1,839,320, issued Jan. 5, 1932 to E. E. Kellems discloses a trailer which is adapted to be used in connection with the loading, transportation and unloading of cable reels, including the use of a collapsible trailer, including a main frame cable reel on wheels where it may be rotated to load or unload cable reels.

U.S. Pat. No. 2,650,730, issued Sep. 1, 1953 to Leon M. Rohm discloses a trailer to carry heavy loads, usable for transporting boats, tanks, and other cumbrous objects.

U.S. Pat. No. 3,690,491, issued Sep. 12, 1972 to Cornelius Butler Jr. discloses a cable reel trailer with a y-shaped main frame pivotably attached to a towing vehicle.

U.S. Pat. No. 3,990,650, issued Nov. 9, 1976 to Joseph C. Devine discloses a loadable trailer for the transportation of reels.

U.S. Pat. No. 4,013,184, issued Mar. 22, 1977 to James H. Lacy discloses a trailer with a pivoted support frame which receives and supports a large refuse container pulled into place on the support frame by means of a lifting frame operated by a hydraulic cylinder.

U.S. Pat. No. 4,701,098, issued Oct. 20, 1987 to Joseph W. Bills, et al. discloses a cable reel handling and transportation trailer with hydraulically operated leveling arms on each side of the trailer to engage a spindle reel assembly and roll it forward.

U.S. Pat. No. 4,762,291, issued Aug. 9, 1988 to Charles J. Sauber discloses a self-loading trailer with an arched carrying cable reel able to accommodate a cable reel and side wall to laterally support the reel and with a hydraulically driven set of maneuvering arms for self-loading.

U.S. Patent Application Publication No. 2015/0166297, published Jun. 18, 2015, inventor Noel C. Smith, et al. discloses a trailer for lifting and transporting cable reels with a pair of substantially perpendicular cantilevers, and a latch assembly.

However, practitioners of those inventions have become aware of certain problems which are presented by those prior art inventions. One particular problem that has plagued users has been that the hydraulic and electrical motors common in the prior art break down and cause problems.

SUMMARY OF THE INVENTION

In review of the above-noted desires of the industry, the present invention provides various aspects, including a cable reel trailer that uses the automotive force of a tractor or truck used to transport the trailer, a method of making same, and a method of using. This includes a pivotally connected tongue that is pivotally connected to the main frame of the trailer. This overcomes many of the aforementioned problems with the prior art because there is no motor or hydraulic system necessary for lifting the cable reel securely on to the trailer.

In accordance with the present invention, the towing automotive force, such as a truck, tractor or any other hauling vehicle, provides all the power for lifting the cable reel, rather than requiring a separate power source on the trailer for doing the heavy lifting. By locking up the wheel on the trailer with a wheel stop, the forward movement provided by a towing truck can concentrate on lifting the cable reel instead of moving the trailer forward. This means that no separate on-board power is needed for lifting the cable reel.

My unique cantilever design pulls the weight of the cable reel over the axle. By utilizing a pivot point on a main frame, a 90 degree loading position is made possible. As my main frame pivots and then locks down onto the trailer tongue, once the cable reel has been lifted and brought it into position over the axle, the main frame can be locked down by a cotter pin so that the trailer can be safely transported to a job site. In addition, the cable reel spindle axle can easily be locked down and secured in place to prevent movement during transportation. This means that there is no possibility of a load shift during transportation. As anyone who drives a tractor trailer attached to a trailer knows, load shifting can be the most dangerous part of their job.

Due to the fact that the present trailer tongue stays fairly level, it is much safer to load a cable reel because the center of gravity is much lower than those shown in the prior art. During the use of my novel cable reel trailer, the operation is much smoother and much safer than prior art inventions as the wheels are stopped and the tractor/trailer being used to pull the main frame into position provides motion that is steady and sure. Upon careful review of the prior art, my design is much simpler, more effective, and safer. One of the true advantages of the present invention is that I have eliminated many components, lowered manufacturing costs, and therefore a cable reel trailer product that is much more economical for buyers.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein.

ELEMENT LIST

10. Cable reel
12. Pivotally connected tongue
14. Wheels
16. Cable reel
18. Main frame
20. Stanchion
21. Cable reel stabilizer receiver
22. Trailer side supports
24. Trailer crossmember
25. Frame pivot support arms
26. Frame pivot
27. Tongue extension offset arm
28. Wheel stop
30. Trailer in upright position
32. Cable reel
34. Cable reel spindle
36. Cable reel spindle receiving indent
38. Frame pivot
39. Frame pivot support arms
40. Main frame
41. Tongue extension offset arm
42. Trailer crossmember
43. Trailer Tongue
44. Wheels
46. Wheel stop
48. Stanchion
50. Trailer in upright position
52. Pivotally connected tongue
54. Main frame
55. Frame pivot support arms
56. Frame pivot
57. Tongue extension offset arm
58. Trailer crossmember
60. Cable reel
62. Wheel
64. Wheel stop
66. Stanchion
70. Trailer in lifting motion
72. Pivoting tongue
74. Frame pivot
75. Frame pivot support arms
76. Trailer crossmember
77. Tongue extension offset arm
78. Wheel
80. Wheel stop
82. Cable reel
84. Stanchion
90. Pivoting tongue
92. Frame pivot
94. Main frame
95. Frame pivot support arms
96. Trailer crossmember
98. Cable reel
100. Stanchion
101. Cable reel stabilizer receiver
102. Wheel
104. Wheel stop
110. Cable reel trailer
112. Cable reel
114. Stanchion
116. Pivotally connected tongue
117. Tongue extension offset arm
118. Frame pivot support arms
120. Pivotally connected tongue
122. Frame pivot
124. Main frame
125. Frame pivot support arms
126. Main frame securement
127. Tongue extension offset arm
130. Cable reel
132. Stanchion
134. Cable reel spindle
136. Cable reel stabilizer
138. Cable reel stabilizer receiver

DETAILED DESCRIPTION OF THE INVENTION

In accordance with the present invention a new, useful and non-obvious design for a cable reel trailer, a method of making same, and method of using same is disclosed herein. Many of the shortcomings of prior art inventions have been overcome and a cable reel trailer is disclosed that is safer, simpler to manufacture, and is a non-auxiliary powered application. The main frame of my cable reel trailer stays substantially level which is much safer than prior art inventions because the center of gravity is much lower. The cantilever design easily pulls the weight of the cable reel load directly over the axle of the present cable reel trailer. As the tongue of the trailer is attached to a truck, tractor, or some other conventionally available automotive hauling force, solid control over the movement of the cable reel being loaded is achieved. This turns an inherently dangerous operation into one that is much safer, without the use of any additional motive equipment.

Figure 1:
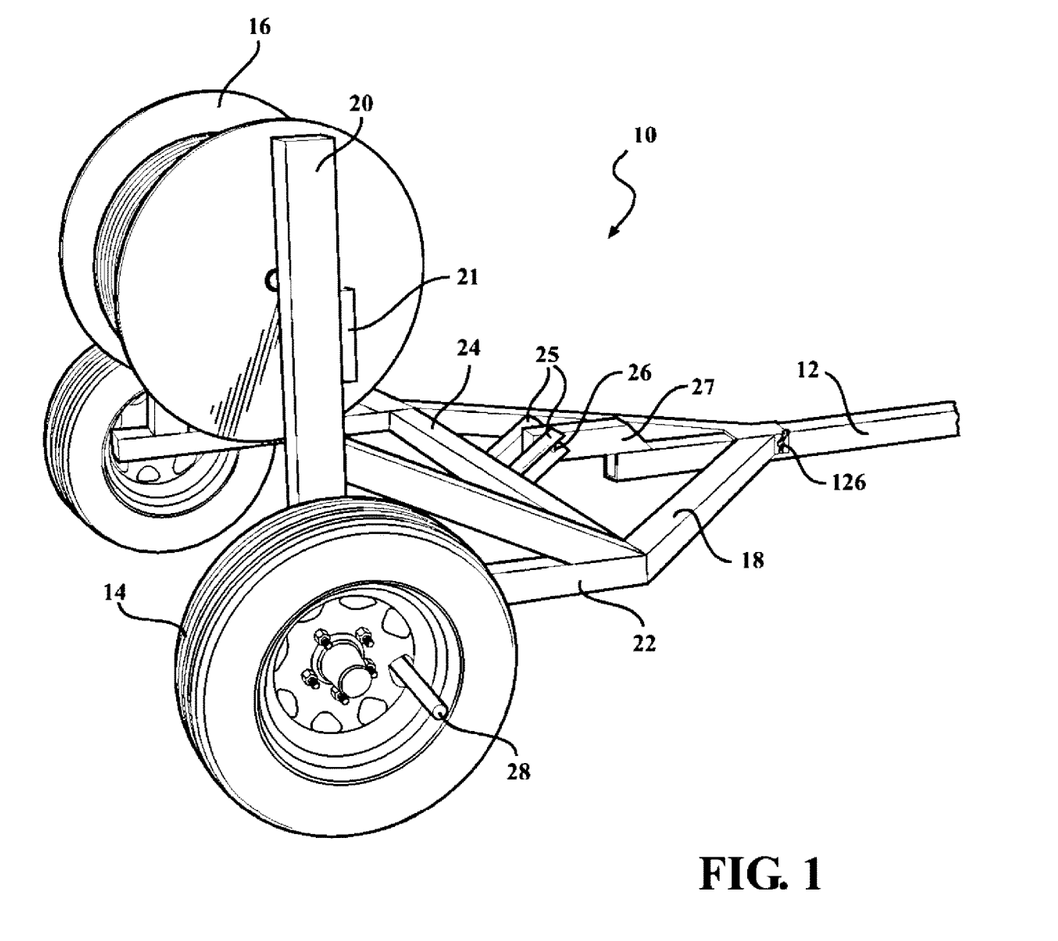
FIG. 1 is a side perspective environmental view of a first aspect of a cable reel trailer made in accordance with the present invention, shown with a cable reel in position for transportation.

Looking now to FIG. 1, a cable reel trailer of the present invention is generally denoted by the numeral 10, including a pivotally connected tongue 12 connected to a main frame 18 on wheels 14 for trailering cable reel 16. Shown in this FIG is cable reel trailer 10 fully loaded, ready for transport. In following Figures, the steps for getting a cable reel loaded onto cable reel trailer 10 will be shown. As shown in FIG. 1, cable reel trailer 10 is now ready to be towed to a job site. Cable reel 16 is shown in its upright loaded position secured by stanchion 20, attached to trailer side supports 22 and held apart securely by trailer cable reel cross member 24. Frame pivot 26 connects pivotally connected tongue 12 to trailer cable reel cross member 24. A wheel stop 28 prevents wheel 14 from rolling during loading and unloading of cable reel trailer 10. Although shown in this aspect, wheel stop 28 may be any suitable wheel stop such as a rod, but may also include a conventional wheel chock (not shown), or any other effective means for preventing wheel 14 from rolling forward as cable reel trailer 10 is being pulled forward. When wheel stop 28 is inserted, cable reel trailer 10 remains stationary while tongue 12 is pulled forward to lift, as shown in more detail hereinafter. A cable reel stabilizer receiver 21 is shown permanently secured to stanchion 20. Frame pivot support arms 25 are pivotally mounted to tongue extension offset arm 27 by frame pivot 26, such that when cable reel trailer 10 is pulled forward by an automotive force, cable reel trailer 10 comes into position for transport. Once main frame 18 has descended into position down on top of trailer tongue 12, cotter pin 126 is inserted to stabilize main frame 18 to tongue 12. The following figures illustrate the various stages of operation to lift a cable reel.

Figure 2:
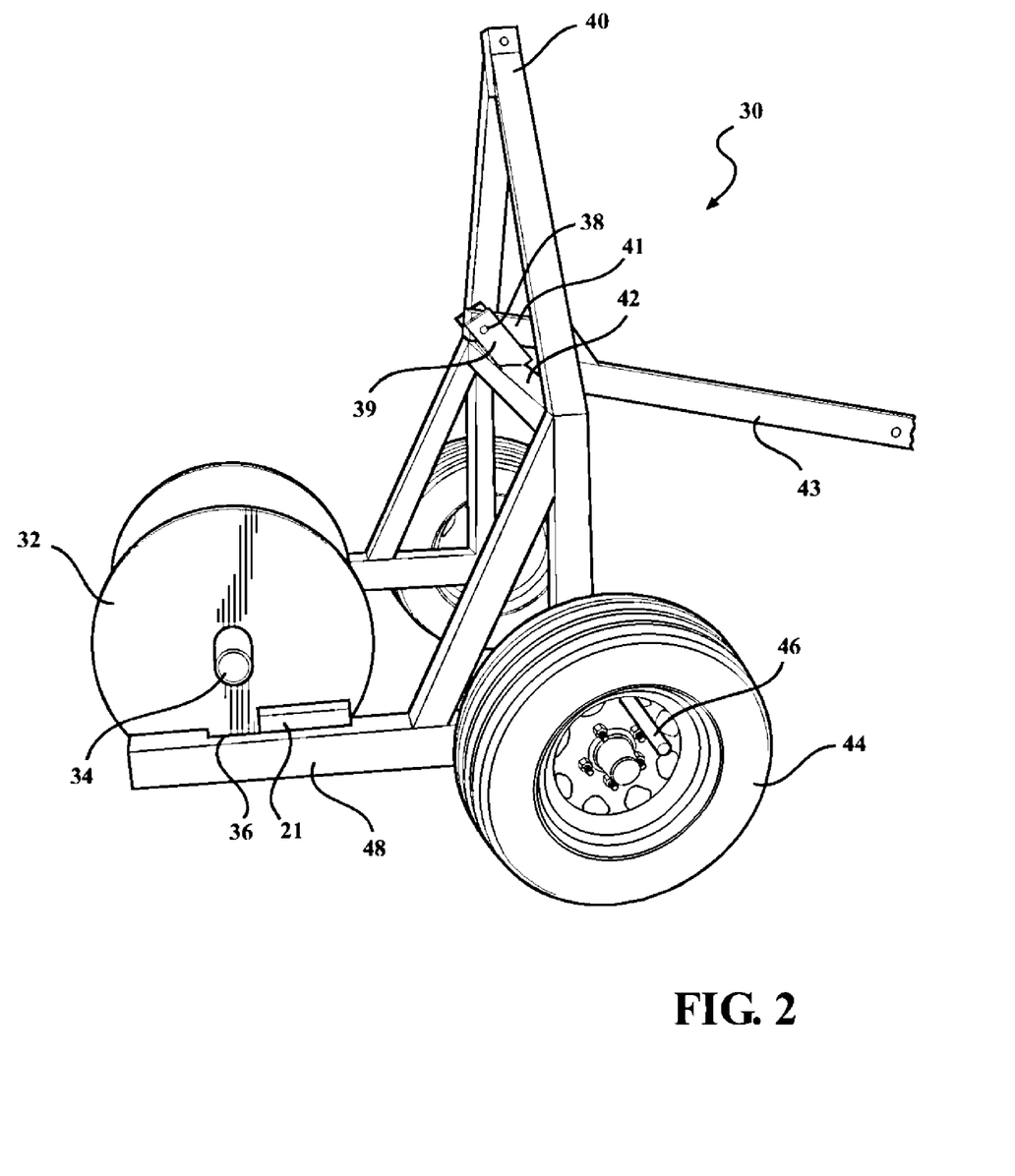
FIG. 2 illustrates a cable reel on the ground ready for lifting.

FIG. 2 shows the beginning of the method of using the present cable reel trailer in the operation of loading cable reel 32 onto cable reel trailer 30. In this first step, a cable reel 32 is rolled on the ground into position between a pair of stanchions 48 attached to the cable reel trailer 30, ready to be lifted for transport. Cable reel 32 includes a cable reel spindle 34 running through the center of cable reel 32, and said cable reel spindle 34 is to be received within cable wheel spindle receiving indents 36 formed into stanchions 48. Trailer cable reel cross member 42 extends between both sides of main frame 40. Frame pivot support arms 39 are pivotally connected by pivot 38 to tongue extension offset arm 41 that is permanently secured to pivotally connected tongue 43. Wheels 44 are prevented from rolling by wheel stop 46. Wheels 44 are attached to main frame 40, which is shown in the loading position such that main frame 40 is sticking up in the air, and wheels 44 are prevented from rolling forward by the use of a wheel stop 46. As cable reel trailer 30 is pulled forward by a forward force, cable reel spindle 34 is lifted upward in cable reel spindle receiving indent 36 formed into stanchion 48. Trailer tongue 43 is to be attached to a common trailer hitch on a truck (not shown), and as the truck pulls forward, wheels 44 are prevented from rolling forward by wheel stop 46, so that all the pulling force is exerted onto trailer tongue 43 which pulls the tongue extension offset arm 41 forward, thereby pulling frame pivot support arms 39 forward, which then pulls main frame 40 downward and forward. Cable reel stabilizer receiver 21 will be used after trailer 30 is in position for transport, and will be shown in operation in FIG.'s described more fully hereinbelow.

Figure 3:
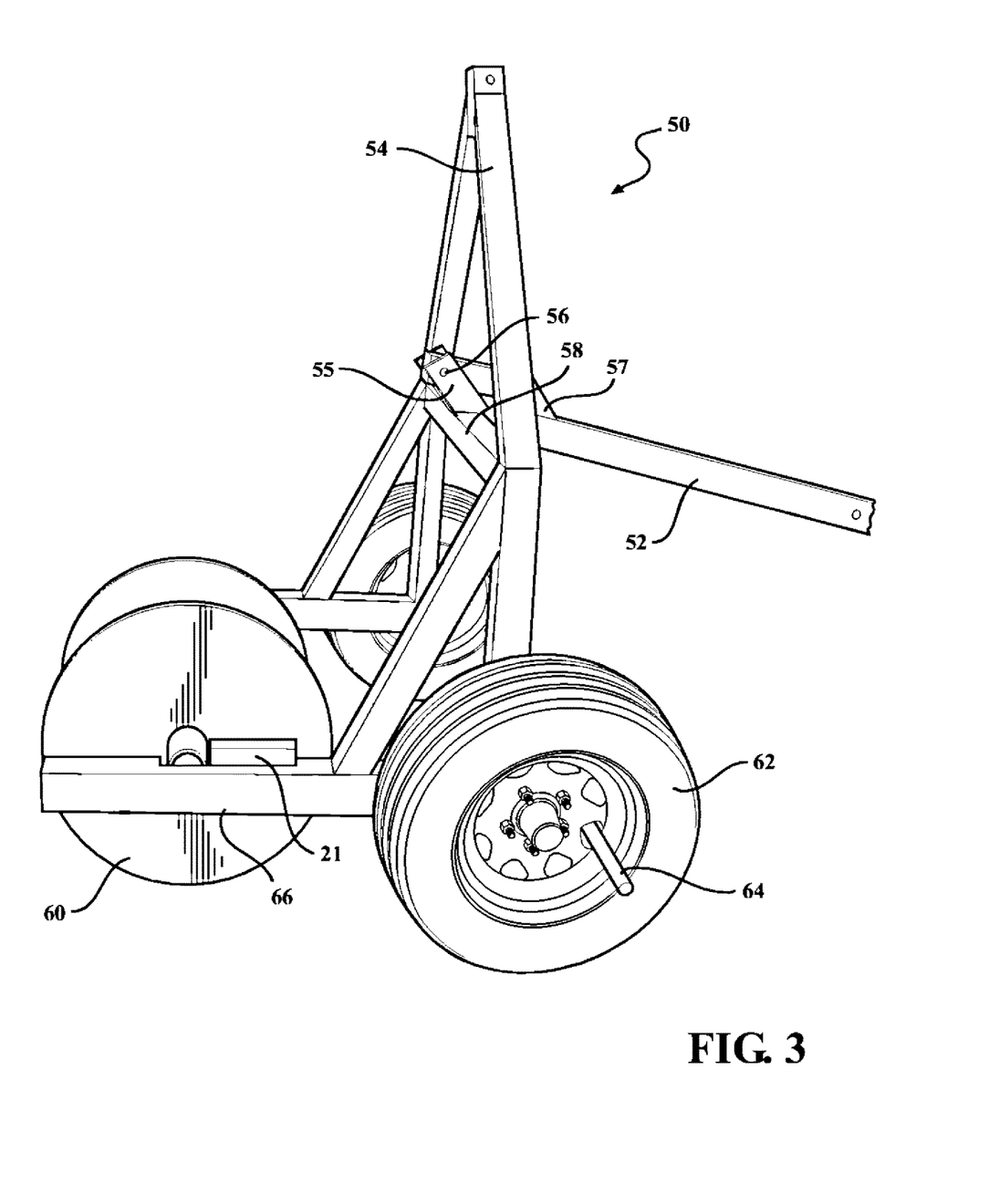
FIG. 3 is an illustration of the cable reel in position ready for lifting.

FIG. 3 shows cable reel trailer 50 including main frame 54 in its upright position with pivotally connected tongue 52 at an inclined angle attached by its distal end to the automotive vehicle, whether it is a truck, tractor, or any other pulling force vehicle with a trailer hitch on it. Pivotally connected tongue 52 includes a conventional trailer hitch receiver (not seen here) which attaches like any other trailer to a trailer hitch on a vehicle. While the tractor or truck is pulling forward, wheels 62 are prevented from rolling by wheel stop 64. Cable reel 60 drops into a recess within stanchion 66 such that when cable reel trailer 50 is pulled forwardly and downwardly into place, cable reel 60 is secured therein. Again, frame pivot support arms 55 are pivotally connected to tongue extension offset arm 57 by frame pivot 56. Frame pivot support arms 55 are permanently affixed to trailer crossmember 58 such that when tongue extension offset arm 57 is pulled forward, trailer frame 54 is pulled forwardly and downwardly.

Figure 4:
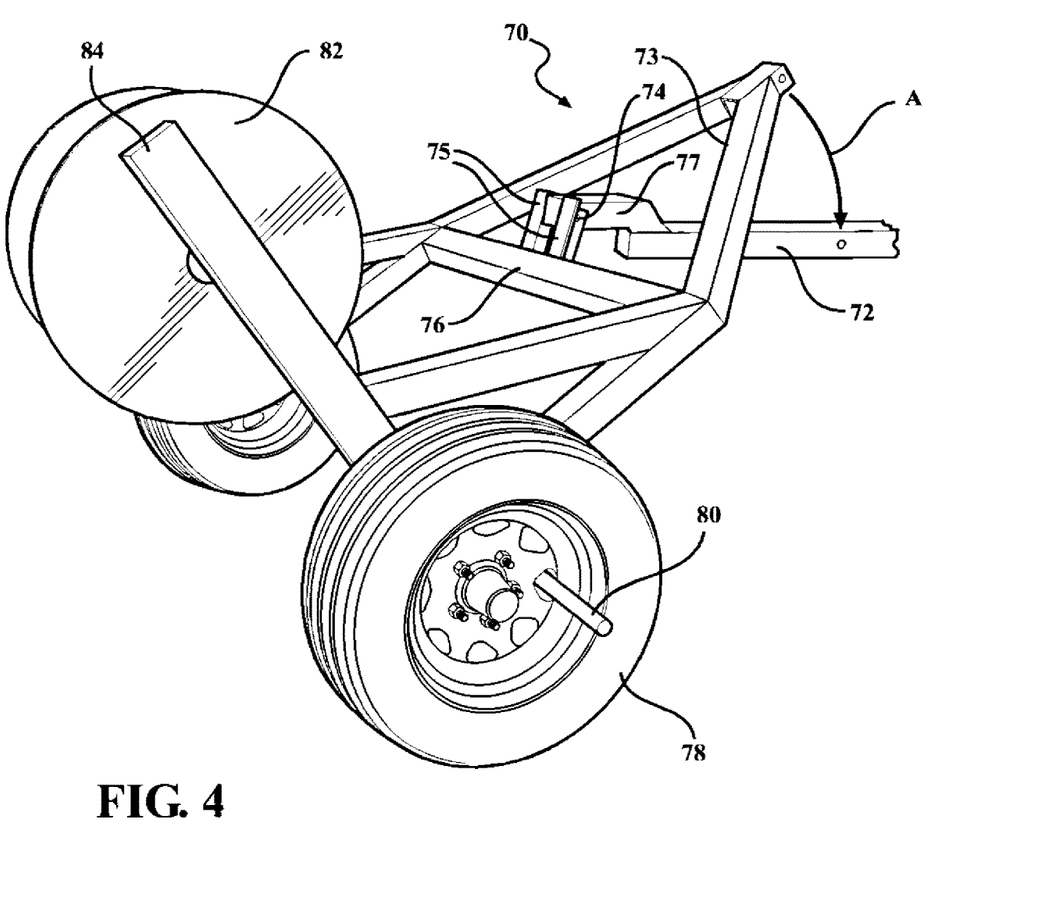
FIG. 4 shows the cable reel trailer midway through the lifting process.

FIG. 4 shows the next stage of the operation where this cable reel trailer is generally being denoted by numeral 70, including a pivotally connected tongue 72 with a pivot 74 attached to cable reel cross member 76. As can be seen in this FIG. 4, pivotally connected tongue 72 is being pulled forward by the tractor or truck while wheel 78 has been held in place by wheel stop 80, and essentially all the forward force is exerted onto pivotally connected trailer tongue 72 which pulls the tongue extension offset arm 77 forward, thereby pulling frame pivot support arms 75 forward, which then pulls main frame 73 downward and forward. Cable reel 82 has dropped down into a secure indent (not seen in this FIG.) within stanchion 84 and as the method of using cable reel trailer 70 proceeds, as shown by arrow "A", main frame 73 drops down onto pivotally connected tongue 72 safely.

Figure 5:
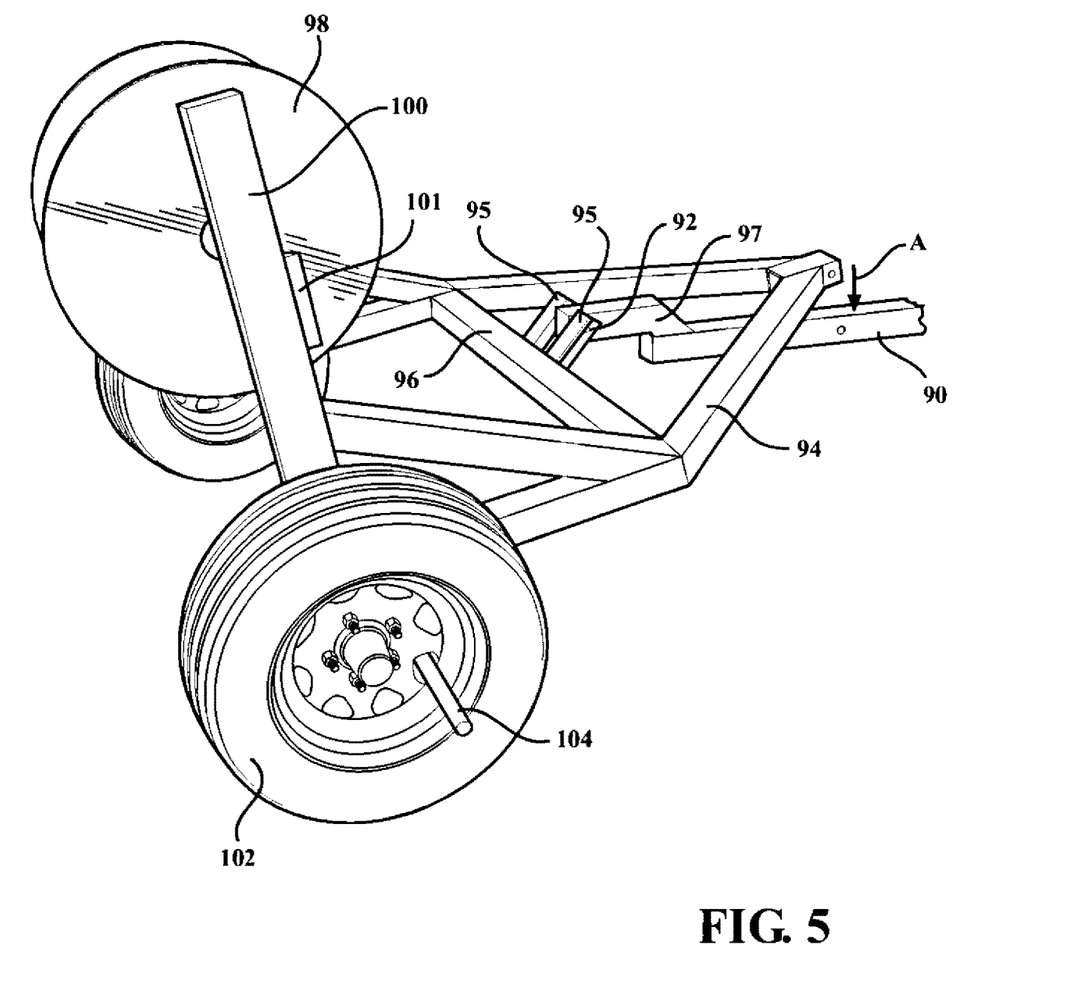
FIG. 5 shows the cable reel trailer with the cable reel in position, wherein the process is nearly finished and the main frame is almost touching the pivotally connected tongue of the present invention.

FIG. 5 shows the present invention nearly in its transporting position now that main frame 94 is nearly contacting pivotally connected tongue 90. As one can see, with the wheel 102 being stopped from rolling by wheel stop 104, all the pulling force is exerted onto pivotally connected trailer tongue 90 which pulls the tongue extension offset arm 97 forward, thereby pulling frame pivot support arms 95 forward, which then pulls main frame 94 downward and forward, utilizing pivot 92 to pull cable reel cross member 96 downward in the direction of arrow "A", such that cable reel 98 and stanchion 100 are nearly in the upright position for transporting, where cable reel stabilizer receiver 101 can then be utilized. As in the other aspects of invention, wheel 102 had been prevented from rolling by wheel stop 104.

Figure 6:
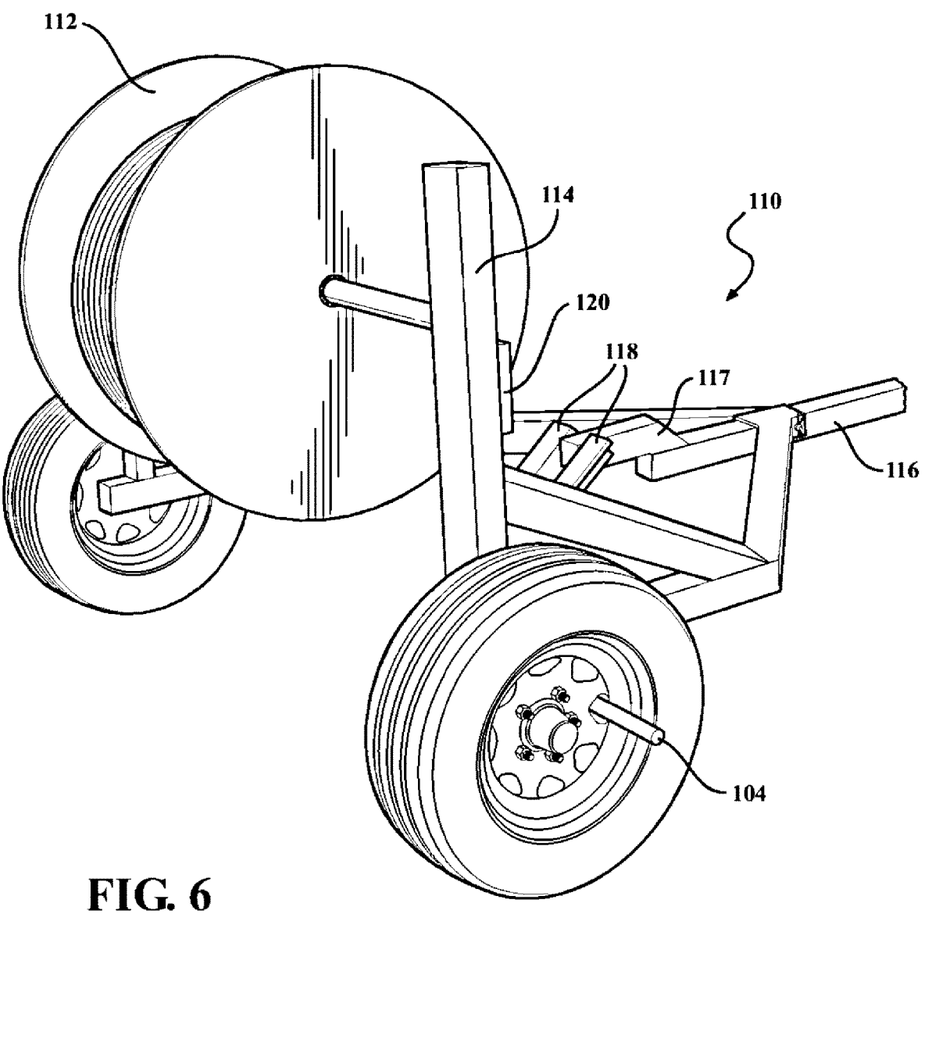
FIG. 6 shows the cable reel trailer in its final resting position, ready to be transported to the job site.

FIG. 6 shows the cable reel trailer as generally denoted by numeral 110 in the proper position for transporting with cable reel 112 supported on stanchions 114. One can see that pivotally connected tongue 116 is in full horizontal position, extending frame pivot support arms 118 by pivoting on tongue extension offset arm 117. Cable reel 112 is being supported in its upright position by stanchion 114, ready to be secured by cable reel stabilizer receiver 120 and go on the road. Wheel stop 104 may be removed from the wheel and inserted into the cable reel stabilizer 120 to secure cable reel 112 during transport.

Figures 7, 8:
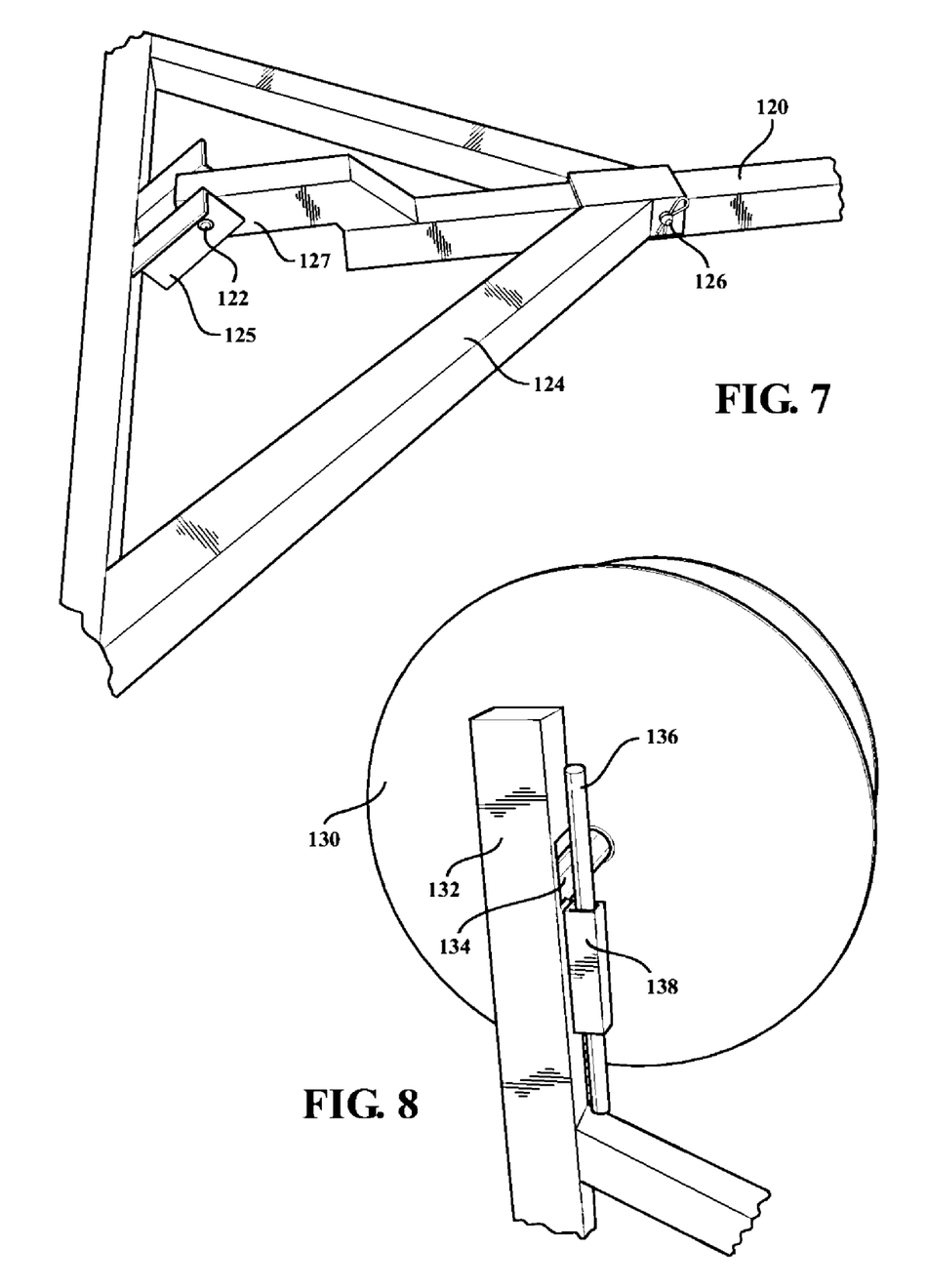
FIG. 7 shows in detail where the main frame contacts the pivotally connected tongue and is secured by a cotter pin.
FIG. 8 is a perspective view of the cable reel locked down in position on a stanchion in accordance with the present invention.

FIG. 7 shows my cable reel trailer in its most downward position, with the pivotally connected tongue 120 and the main frame 124 in contact. Cotter pin 126 secures tongue 120 to main frame 124, while pivot 122 remains in place for the support while transporting. Frame pivot support arms 125 remains pivotally connected to tongue extension offset arm 127 during transport.

FIG. 8 shows cable reel 130 having spindle 134 extending therethrough, received by stanchion 132 in a safe position. A cable reel stabilizer 136 finds a home in cable reel stabilizer receiver 138, so that cable reel 130 cannot move forward during transport.

Figure 9:
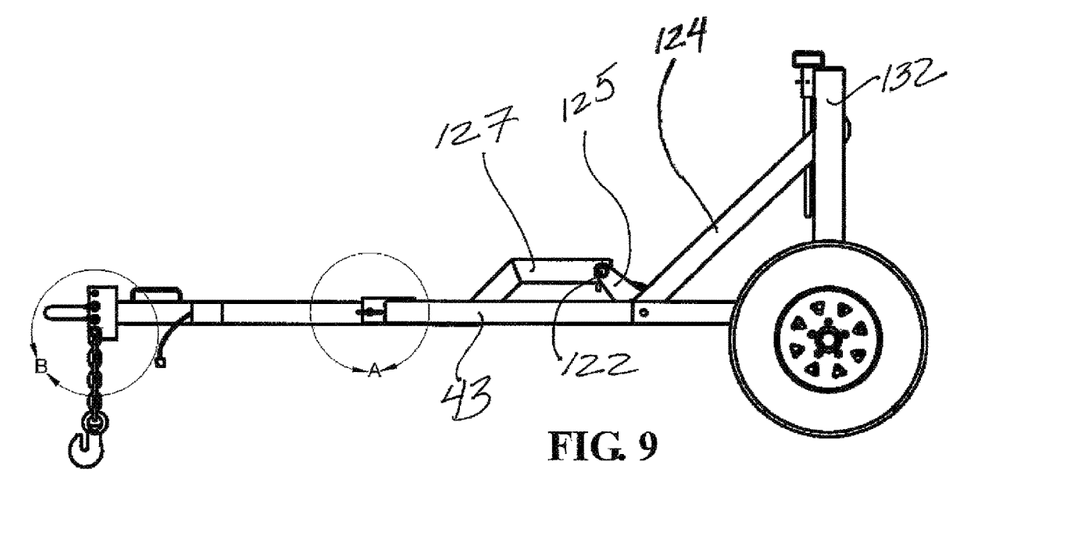
FIG. 9 is a perspective view of another aspect of the present invention with egg-shaped pivot support arms.
Figure 10:
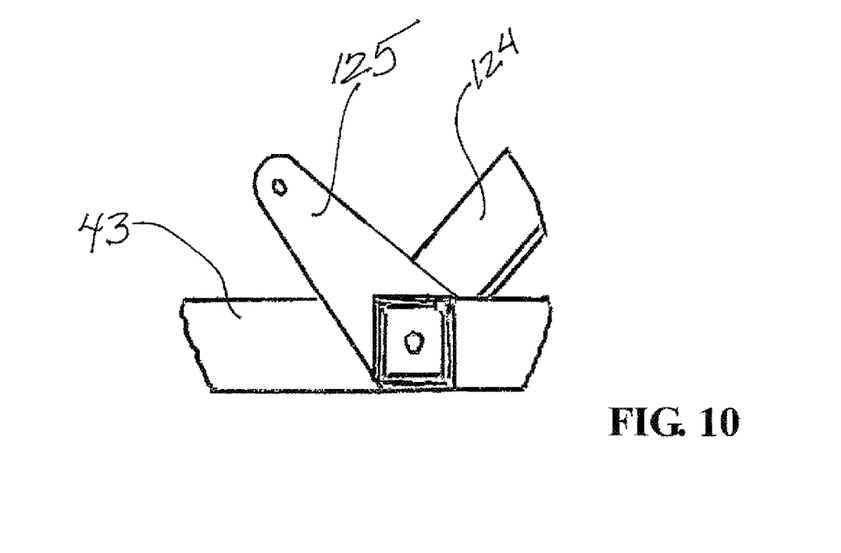
FIG. 10 is a side view of the egg-shaped pivot support arm of FIG. 9.

With combined reference to FIGS. 9 and 10, there is illustrated yet another aspect of the present invention wherein frame pivot support arms 125 have an egg-shaped configuration. Frame pivot support arms 125 are permanently affixed to main frame 124 and trailer tongue 43, and are pivotally connected to tongue extension offset arm 127 by frame pivot 122. Stanchion 132 is permanently affixed to main frame 124 to support the cable reel. The process described hereinabove is utilized in this aspect, as well.

In summary, numerous benefits have been described which result from employing any or all of the concepts and the features of the various specific aspects of the present invention, or those that are within the scope of the invention. The cable reel trailer performs much more safely than the prior art inventions with less cost, less equipment to break down, and without the possibility of load shifting during transportation.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated.

What is claimed is:

1. A cable reel trailer having wheels that uses the towing automotive force of a tractor or truck to load cable reels onto the cable reel trailer and transport the loaded trailer, comprising:
   a main frame trailer for loading a cable reel and transporting the cable reel to a job site;
   said main frame trailer including a trailer tongue adapted for conventional attachment to a trailer hitch on an automotive vehicle capable of towing;
   said trailer tongue being affixed to said main frame trailer, and said trailer tongue being pivotally connected to the main frame of the trailer;
   a trailer crossmember spanning the main frame trailer;
   at least one frame pivot support arm affixed to said trailer crossmember;
   a tongue extension offset arm angularly counterpoised and affixed to the trailer tongue, said angularly counterpoised tongue extension offset arm being angled and offset to spatially compensate for the trailer crossmember for an upright loading position and wherein said tongue extension offset arm is pivotally connected to said at least one frame pivot support arm; and
   at least one stanchion for securing the cable reel in an upright loaded position, said at least one stanchion being attached to trailer side supports that are held apart securely by the trailer crossmember,
   whereby the main frame of the cable reel trailer stays substantially level while pulling the weight of the cable reel load over the axle of the cable reel trailer, such that a towing automotive force attached to the trailer tongue provides all the heavy lifting power for lifting the cable reel into position over the axle of the cable reel trailer, rather than requiring a separate power source on the trailer for doing the heavy lifting.

2. The cable reel trailer of claim 1, further comprising a wheel stop to prevent forward movement of the trailer during loading of the cable reel, whereby automotive force is dedicated to loading the cable reel rather than moving the trailer forward.

3. The cable reel trailer of claim 1, wherein said stanchion further includes a recess therein for receiving a cable reel spindle extending through the cable reel.

4. The cable reel trailer of claim 1, further comprising a cable reel stabilizer receiver for receiving a cable reel stabilizer to secure the cable reel to the trailer during transport.

* * * * *